United States Patent
Goldman et al.

(10) Patent No.: US 9,103,059 B2
(45) Date of Patent: Aug. 11, 2015

(54) METHODS AND APPARATUS TO MANIPULATE EMBROIDERY DESIGNS VIA A COMMUNICATION NETWORK

(71) Applicant: Vistaprint Schweiz GmbH, Winterthur (CH)

(72) Inventors: David A. Goldman, Endwell, NY (US); Nirav B. Patel, Binghamton, NY (US)

(73) Assignee: VISTAPRINT SCHWEIZ GMBH, Winterthur (CH)

( * ) Notice: Subject to any disclaimer, the term of this patent is extended or adjusted under 35 U.S.C. 154(b) by 0 days.

(21) Appl. No.: 14/083,238

(22) Filed: Nov. 18, 2013

(65) Prior Publication Data

US 2014/0074278 A1    Mar. 13, 2014

Related U.S. Application Data

(63) Continuation of application No. 12/969,359, filed on Dec. 15, 2010, now Pat. No. 8,588,954, which is a continuation of application No. 11/767,867, filed on Jun. 25, 2007, now Pat. No. 7,920,939.

(60) Provisional application No. 60/848,080, filed on Sep. 30, 2006.

(51) Int. Cl.
*D05C 5/02* (2006.01)
*G06T 11/60* (2006.01)

(52) U.S. Cl.
CPC . *D05C 5/02* (2013.01); *G06T 11/60* (2013.01); *G06T 2200/16* (2013.01)

(58) Field of Classification Search
USPC .......................... 700/130–138; 112/102.5, 475
See application file for complete search history.

(56) References Cited

U.S. PATENT DOCUMENTS 5,668,730 A * 9/1997 Tsonis et al. .................. 700/138
5,791,271 A * 8/1998 Futamura .................. 112/102.5

(Continued)

FOREIGN PATENT DOCUMENTS

EP        0364138 A2    4/1990
EP         364138 A2 *  4/1990

(Continued)

OTHER PUBLICATIONS

International Bureau, "International Preliminary Report on Patentability," issued in connection with counterpart international application serial No. PCT/US2008/054550, issued Jan. 5, 2010 (7 pages).

(Continued)

*Primary Examiner* — Danny Worrell
(74) *Attorney, Agent, or Firm* — Hanley, Flight & Zimmerman, LLC

(57) ABSTRACT

Methods and apparatus to manipulate embroidery designs via a communication network are disclosed. An example apparatus includes An apparatus for manipulating an embroidery design via a communication network, comprising a client computer to: receive a communication from a server, the communication including embroidery data; display, via a user interface of the client computer, a first image based on the embroidery data; edit the embroidery data stored in a memory of the client computer to create modified embroidery data in response to receiving a command via the user interface of the client computer; and display, via the user interface of the client computer, a second image based on the modified embroidery data in the memory of the client computer.

14 Claims, 9 Drawing Sheets

(56) References Cited

U.S. PATENT DOCUMENTS

| | | | | |
|---|---|---|---|---|
| 5,911,182 | A * | 6/1999 | Uyama et al. | 112/102.5 |
| 6,004,018 | A * | 12/1999 | Kawasato et al. | 700/138 |
| 6,370,442 | B1 * | 4/2002 | Wang | 700/138 |
| 6,397,120 | B1 * | 5/2002 | Goldman | 700/138 |
| 6,804,573 | B2 * | 10/2004 | Goldman | 700/138 |
| 6,807,456 | B1 * | 10/2004 | Costin et al. | 700/132 |
| 6,836,695 | B1 * | 12/2004 | Goldman | 700/137 |
| 6,889,111 | B2 * | 5/2005 | Tomita | 700/138 |
| 6,947,808 | B2 * | 9/2005 | Goldman | 700/138 |
| 6,968,255 | B1 * | 11/2005 | Dimaridis et al. | 700/131 |
| 7,016,756 | B2 * | 3/2006 | Goldman | 700/138 |
| 7,016,757 | B2 * | 3/2006 | Goldman | 700/138 |
| 7,228,195 | B2 * | 6/2007 | Hagino | 700/138 |
| 7,920,939 | B2 * | 4/2011 | Goldman et al. | 700/138 |
| 8,588,954 | B2 * | 11/2013 | Goldman et al. | 700/138 |
| 2001/0047250 | A1 * | 11/2001 | Schuller et al. | 703/1 |
| 2002/0007228 | A1 * | 1/2002 | Goldman | 700/138 |
| 2004/0125138 | A1 * | 7/2004 | Jetha et al. | 345/764 |
| 2004/0243272 | A1 * | 12/2004 | Goldman | 700/138 |
| 2004/0243273 | A1 | 12/2004 | Goldman | |
| 2004/0243274 | A1 * | 12/2004 | Goldman | 700/138 |
| 2004/0243275 | A1 * | 12/2004 | Goldman | 700/138 |
| 2010/0106283 | A1 * | 4/2010 | Harvill et al. | 700/138 |
| 2010/0108754 | A1 * | 5/2010 | Kahn | 235/375 |
| 2011/0087728 | A1 | 4/2011 | Goldman et al. | |

FOREIGN PATENT DOCUMENTS

| | | |
|---|---|---|
| JP | 2004129947 | 4/2004 |
| JP | 2004129947 A * | 4/2004 |

OTHER PUBLICATIONS

International Bureau, "International Search Report and Written Opinion" issued in connection with counterpart international patent application No. PCT/US08/54550, mailed May 21, 2008 (8 pages).

United States Patent and Trademark Office, "Office Action" issued in connection with U.S. Appl. No. 11/767,867, notified Jul. 9, 2010 (13 pages).

United States Patent and Trademark Office, "Notice of Allowance" issued in connection with U.S. Appl. No. 11/767,867, mailed Dec. 1, 2010 (4 pages).

United States Patent and Trademark Office, "Office Action" issued in connection with U.S. Appl. No. 12/969,359, mailed Apr. 8, 2013 (10 pages).

United States Patent and Trademark Office, "Office Action" issued in connection with U.S. Appl. No. 12/969,359, mailed Apr. 20, 2012 (15 pages).

United States Patent and Trademark Office, "Notice of Allowance" issued in connection with U.S. Appl. No. 12/969,359, mailed Jul. 17, 2013 (4 pages).

* cited by examiner

FIG. 1

EXAMPLE DESIGN SHOWING STICHES
AS INDIVIDUAL BLACK LINE SEGMENTS
EXAMPLES OF VARIOUS TYPES OF
EMBROIDERY DATA ILLUSTRATED BELOW

10a
A. TEXT OBJECT DATA
A SEQUENCE OF LETTERS (AS WELL
AS FONT NAME AND PARAMETERS)
SPECIFY GROUPS OF LETTERS

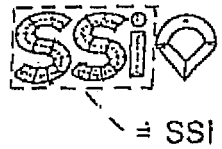

10b
B. LETTER DATA
A GROUPING OF PRIMITIVE DATA
MAY COMPRISE A SINGLE
ALPHANUMERIC LETTER

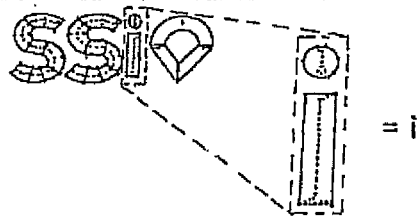

10c
C. EMBROIDERY LINE DATA
A SET OF CONNECTED LINES AND
ARC WITH PARAMETERS SUCH AS
WIDTHS OR MITER TYPES SPECIFY
RELATED STITCH PRIMITIVE DATA
(EG. COLUMNS)

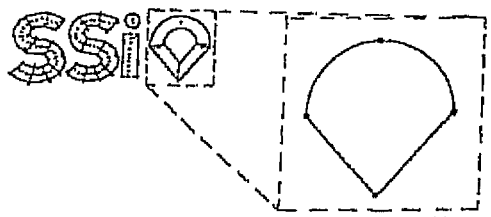

10d
D. STITCH PRIMITIVE DATA
A COLUMN PRIMITIVE WIREFRAME
WITH 3 ARC SECTIONS AND RELATED
CONTROL POINTS IS HIGHLIGHTED

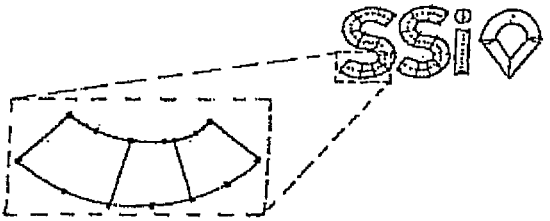

10e
E. LOW-LEVEL STITCH DATA
STITCH END POINT LOCATIONS ARE
SHOWN AS SMALL BLACK DOTS (I.E.
NEEDLE PENETRATION LOCATIONS)

FIG. 5

| DECIMAL VALUE | BASE-64 ENCODING | DECIMAL VALUE | BASE-64 ENCODING | DECIMAL VALUE | BASE-64 ENCODING | DECIMAL VALUE | BASE-64 ENCODING |
|---|---|---|---|---|---|---|---|
| 0 | '0' | 16 | 'G' | 32 | 'W' | 48 | 'm' |
| 1 | '1' | 17 | 'H' | 33 | 'X' | 49 | 'n' |
| 2 | '2' | 18 | 'I' | 34 | 'Y' | 50 | 'o' |
| 3 | '3' | 19 | 'J' | 35 | 'Z' | 51 | 'p' |
| 4 | '4' | 20 | 'K' | 36 | 'a' | 52 | 'q' |
| 5 | '5' | 21 | 'L' | 37 | 'b' | 53 | 'r' |
| 6 | '6' | 22 | 'M' | 38 | 'c' | 54 | 's' |
| 7 | '7' | 23 | 'N' | 39 | 'd' | 55 | 't' |
| 8 | '8' | 24 | 'O' | 40 | 'e' | 56 | 'u' |
| 9 | '9' | 25 | 'P' | 41 | 'f' | 57 | 'v' |
| 10 | 'A' | 26 | 'Q' | 42 | 'g' | 58 | 'w' |
| 11 | 'B' | 27 | 'R' | 43 | 'h' | 59 | 'x' |
| 12 | 'C' | 28 | 'S' | 44 | 'i' | 60 | 'y' |
| 13 | 'D' | 29 | 'T' | 45 | 'j' | 61 | 'z' |
| 14 | 'E' | 30 | 'U' | 46 | 'k' | 62 | '-' |
| 15 | 'F' | 31 | 'V' | 47 | 'l' | 63 | '_' |

E.G. DECIMAL VALUE = '3871' EQUIVALENT TO BASE-64 VALUE = 'yv'

FIG. 6
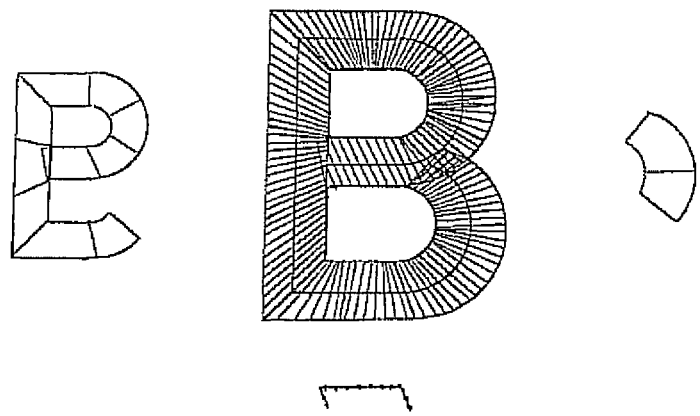
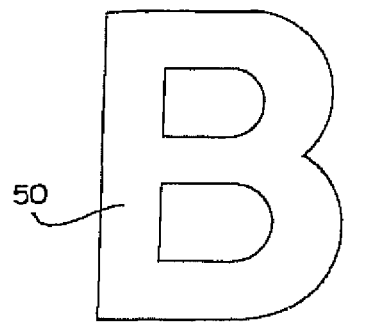
COMPOSITE OBJECT WITH
THREE EDGE CONTOURS
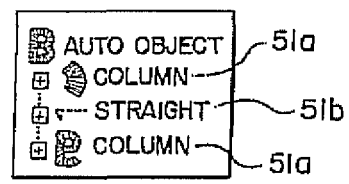
HIERARCHICAL VIEW OF
EMBROIDERY DATA

FIG. 8

```xml
<seurat rq="0">
    <dispimg bkcx="316" bksrc="http://localhost/T00/000/sbkl018.jpg" cy="39" cx="51" bkcy="262"
        src="http://localhost/T00/000/sl018.jpg"/>
    <colors>
        <color familyID="0" rgb="6826124" threadID="0" id="0" vendorID="0" />
    </colors>
    <textobj sf="1.541621e-001" lh="1.500000e+001" ld="1372171830" fh="973002" bl="489500">
        <m b="0.000000e+000" e="1.000000e+000" c="0.000000e+000" f="0.000000e+000"
a="1.000000e+000"
            d="0.000000e+000" />
        <char ls="21622">
            <gobj colorId="0">
                <contour>
                    <pt x="1" y="2999" />
                    <pt x="231998" y="636002" />
                    <pt x="347999" y="972998" />
                    <pt x="396156" y="972531" />
                    <pt x="396000" y="972998" />
                    <pt x="681998" y="976001" />
                    <pt x="803001" y="636002" />
                    <pt x="1036002" y="3998" />
                    <pt x="721002" y="4997" />
                    <pt x="679864" y="125928" />
                    <pt x="356685" y="125065" />
                    <pt x="314002" y="2999" />
                </contour>
                <contour>
                    <pt x="422751" y="314003" />
                    <pt x="615879" y="314003" />
                    <pt x="520642" y="593949 />
                </contour>
            </gobj>
        </char>
        <char ls="21622">
            <gobj colorId="0">
                <countour>
                    <pt x="-1000" y="959998" />
                    <pt x="271999" y="959998" />
                    <pt x="271999" y="22997" />
                    <pt x="-1000" y="22997" />
                </countour>
            </gobj>
        </char>
    </textobj>
</seurat>
```

METHODS AND APPARATUS TO MANIPULATE EMBROIDERY DESIGNS VIA A COMMUNICATION NETWORK

CROSS-REFERENCE TO RELATED APPLICATION

This patent arises from a continuation of U.S. Non-Provisional patent application Ser. No. 12/969,359, filed Dec. 15, 2010, which is a continuation of U.S. Non-Provisional patent application Ser. No. 11/767,867, filed Jun. 25, 2007 (now U.S. Pat. No. 7,920,939), and claims priority under 35 USC 119(e) to U.S. Provisional Patent Application Ser. No. 60/848,080, filed on Sep. 30, 2006. U.S. Non-Provisional patent application Ser. No. 12/969,359, U.S. Non-Provisional patent application Ser. No. 11/767,867, to U.S. Provisional Patent Application Ser. No. 60/848,080 are hereby incorporated by reference in their entireties.

FIELD OF THE DISCLOSURE

The present disclosure pertains to manipulation of embroidery designs and, more particularly, to methods and apparatus to manipulate embroidery designs via a communication network.

BACKGROUND OF THE DISCLOSURE

A wide area network is traditionally used to describe a set of devices, for example, personal computers, cell phones, or web servers, that are connected to each other via digital communication links that may span small or great distances. The Internet is a good example of a wide area network that predominantly connects home or business computers to larger network servers to provide services such as e-mail, web browsing, or instant messaging. Wide area networks may use a variety of protocols to facilitate digital communication over sometimes unreliable or performance varying physical mediums such as telephone wires, television cable networks, or fiber optics. Examples of such protocols include Transmission Control Protocol/Internet Protocol (TCP/IP), Domain Name System (DNS), and Hypertext Transfer Protocol (HTTP). These protocols are also often utilized with specific data formats such as Hypertext Markup Language (HTML) and Extensible Markup Language (XML) to transfer data between two or more points in a reliable and consistent way.

It is also useful to note that the performance of wide area networks, for example how fast data is communicated over links and what latencies exists during communication, may vary substantially when compared to other types of networks such as Local Area Networks or Storage Area Networks. For example, a personal computer using the Internet may send a message requesting a web page from a distant server where the transmission of that request may be relatively slow, for example at a data rate of only a few kilobits per second, and may have a large latency associated with it in that several seconds may pass while waiting for a response to be initiated. When a response is sent, the transmission of that response may occur at a different data rate, for example several megabits per second, allowing the personal computer to receive much more data than what was originally sent in a much shorter period of time. The times and various latencies required to transmit data over a network are important factors to be considered. More specifically, in order to improve systems and methods of communication, it is a common goal to reduce the amount of information that must be transmitted over a network. Furthermore, such improvements will often favor transmitting requests that are significantly smaller than the responses they invoke, for example, measured in the number of bytes transferred.

The above concerns and needs are evident in practically all modern manufacturing processes, including embroidery. Embroidery is the result of creating designs or artwork by sewing stitches of thread at specific locations on a substrate, for example a garment, such that the stitches when viewed as a whole create the appearance of the design or artwork. With the advent of computer controlled embroidery machines many decades ago, the process of creating embroidery was substantially improved by allowing fast and highly precise placement of stitches such that larger and more sophisticated embroidery designs could be much more easily produced. These computerized embroidery machines accept input data that effectively specifies a sequence of coordinate locations, for example x y positions, where each location is typically paired with a specific machine command, for example, sew stitch, trim thread, change needle, or the like. This is a type of embroidery data called low level input data, often referred to as stitch data. Low level stitch data can be quite lengthy and may specify designs containing sequences of many thousands of stitches. Other types of embroidery data include one or more of higher level embroidery data, vector data, composite data, low level stitch data, wireframe data, image data, rendered image data, or the like.

Embroidery data is also often created when people use embroidery computer aided design (CAD) systems or other software that assists in generating the lower level stitch data needed by computerized embroidery machines. For example, using such systems, a user may simply specify a rectangular area as well as a few parameters such as angle, stitch length, and direction to have the area filled with parallel rows of a particular type of stitching. In many cases, this is highly preferred over having to manually specify the exact location of every stitch within the rectangle. This rectangle as well as other various primitive types, for example arced or straight columns, Bezier paths, or the like, combined with user specified stitching parameters constitute another form of embroidery data referred to as wireframe data. It is often more convenient for people to manipulate wireframe data, for example to perform scaling or other editing operations, rather than adding, deleting, or moving individual stitches. Furthermore, this wireframe data is often grouped into even higher levels of abstraction such as individual letters within an alphabet to allow easier creation of wireframe data representing lettered designs in a particular font style, for example, monograms and names.

Many prior art methods exist for creating wireframe data both manually and automatically as well as methods that convert such wireframe data into other forms of embroidery data, such as lower level stitch data. Furthermore, many prior art methods also exist for previewing wireframe and lower level stitch data on a display device. For example, in some cases, stitches are represented as colored line segments or in other cases they may be rendered to look more similar to the appearance of stitches on an actual fabric substrate. Regardless of the actual rendering methods or CAD systems used, prior art here typically entails running computer software on computers that are within the same geographic location as users. Prior art does not include considerations or optimizations to allow a combination of such methods and systems to operate well over a wide area network.

SUMMARY OF THE DISCLOSURE

In accordance with one aspect of the disclosure, there is provided a method to manipulate an embroidery design via a communication network. The method includes receiving at a server, via the communication network, a request from a client computer, the request including first data associated with the embroidery design, processing at least some of the first data at the server to generate at least one of image data or embroidery data, and transmitting, via the communication network, a response to the client computer, the response to be received by a user interface for manipulating embroidery design information at the client computer and including at least one of the image data or the embroidery data.

In accordance with another aspect of the disclosure, there is provided another method to manipulate an embroidery design via a communication network. The method includes executing a user interface for manipulating the embroidery design at a client computer; sending, via the communication network, a request from the client computer to a server, the request generated in response to the user interface and including first data associated with the embroidery design being manipulated via the user interface; receiving, via the communication network, a response at the client computer, the response to be used by the user interface and including at least one of image data or embroidery data; and displaying via the user interface a view of the embroidery design based on the at least one of the image data or the embroidery data.

In accordance with another aspect of the disclosure, there is provided another method to manipulate embroidery designs via a communication network, including communicatively coupling a server to a plurality of client computers via the communication network, processing requests from the client computers at the server, the requests relating to the embroidery designs and the processing including generating embroidery data or image data in response to the requests, and sending responses to the client computers, the responses including at least some of the embroidery data or the image data to enable software executed by the client computers to modify and display the embroidery designs.

In accordance with another aspect of the disclosure, there is provided an apparatus to manipulate an embroidery design via a communication network. The apparatus includes a server configured to receive, via the communication network, a request from a client computer, the request including first data associated with the embroidery design, process at least some of the first data at the server to generate at least one of image data or embroidery data, and transmit, via the communication network, a response to the client computer, the response to be received by a user interface for manipulating embroidery design information at the client computer and including at least one of the image data or the embroidery data.

In accordance with another aspect of the disclosure, there is provided another apparatus to manipulate an embroidery design via a communication network. The apparatus includes a client computer configured to execute a user interface for manipulating the embroidery design at a client computer, send, via the communication network, a request to a server, the request generated in response to the user interface and including first data associated with the embroidery design being manipulated via the user interface, receive, via the communication network, a response, the response to be used by the user interface and including at least one of image data or embroidery data, and display via the user interface a view of the embroidery design based on the at least one of the image data or the embroidery data.

These and other aspects and features will become more apparent upon reading the following detailed description when taken in conjunction with the accompanying drawings.

BRIEF DESCRIPTION OF THE DRAWINGS

FIG. 1 is a list of examples of various types of embroidery data;

FIG. 5 is an example encoding scheme that allows decimal values to be expressed as base-64 values;

FIG. 6 is an illustration of how a composite object is formed from embroidery primitive data;

FIG. 8 is an example excerpt of XML created by the response creation method.

Figure 2:
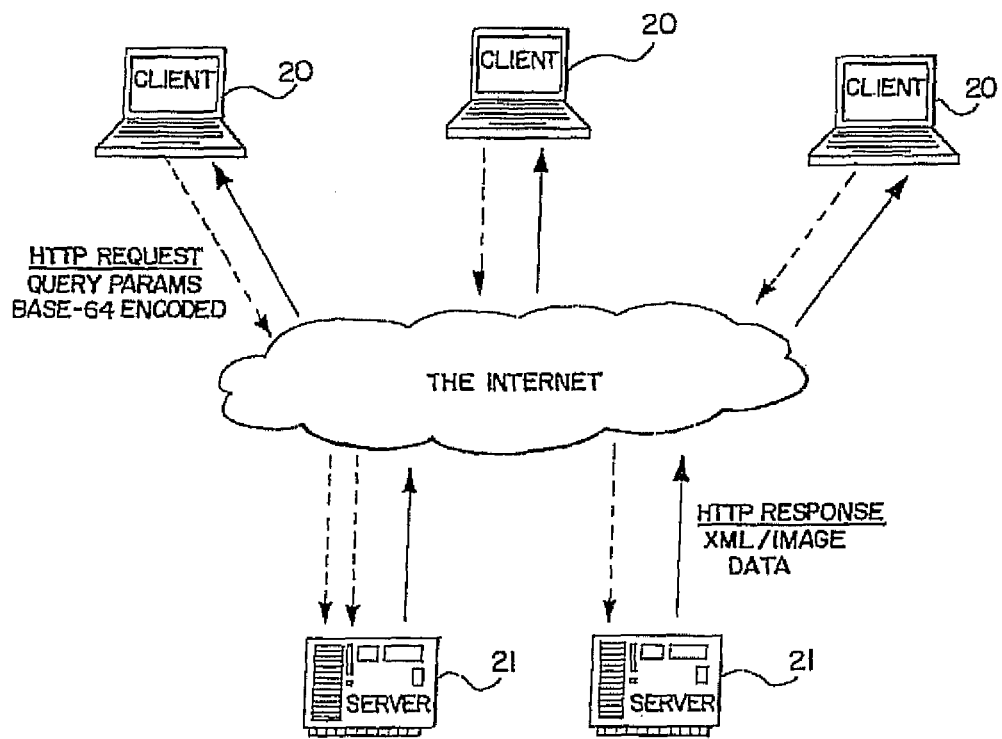
FIG. 2 is an example wide-area network showing transfer of embroidery data between clients and servers.

While the present disclosure is susceptible to various modifications and alternative constructions, certain illustrative embodiments thereof have been shown in the drawings and will be described below in detail. It should be understood, however, that there is no intention to limit the present invention to the specific forms disclosed, but on the contrary, the intention is to cover all modifications, alterative constructions, and equivalents falling within the scope of the present disclosure.

DETAILED DESCRIPTION OF THE DISCLOSURE

Figure 3:
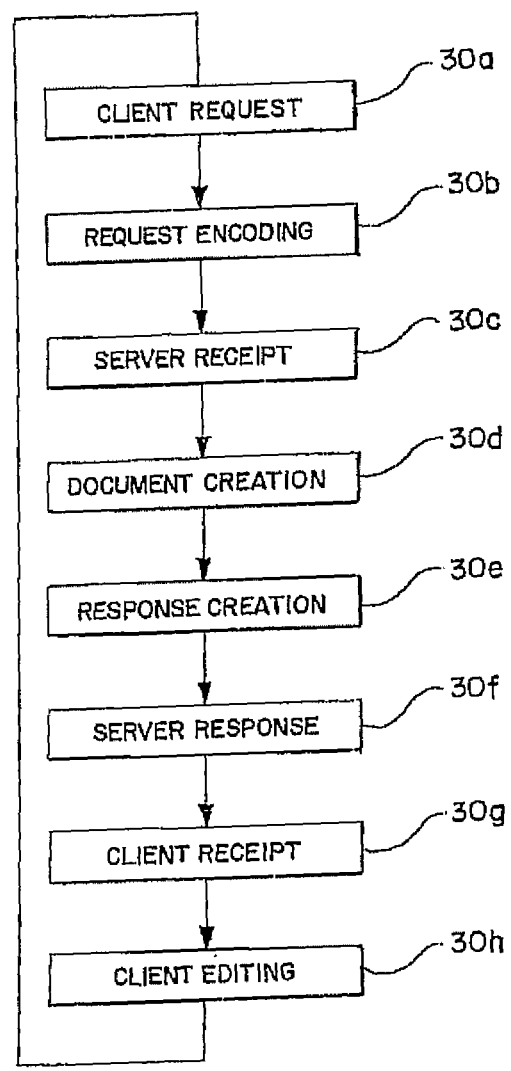
FIG. 3 is a flow chart depicting a process for creating and manipulating embroidery designs over a wide area network.

In the description that follows, with reference to FIG. 1, a method and system to create and manipulate embroidery designs within the context of a wide area network transfer, various types of embroidery data 10a-e are described. It is also important to note the differences between the embroidery data 10a-e shown. The first data type, text object data 10a, shows very high level data, for example a high level of abstraction, while letter data 10b, embroidery line data 10c, stitch primitive data 10d, and low level stitch data 10e show subsequently lower level embroidery type data with low level stitch data 10e depicting the lowest level of abstraction. In FIG. 2, some such data is passed between a client 20, for example a home computer, and a server 21, for example a computer providing HTTP data. FIG. 3 depicts the typical steps or activities involved in the process as a whole. These steps include: client request 30a, request encoding 30b, server receipt 30c, document creation 30d, response creation 30e, server response 30f, client receipt 30g, and client editing 30h at which point a new client request 30a is often eventually initiated based on the results of previous methods. The transfer process is often initiated by the client 20 when such activities are desired by a client user. As used herein, "embroidery data" means any of text object data, letter data, line data, stitch primitive data, low level stitch data, vector data, composite object data, rendered image data, or geometric affine transformation data. "High-level embroidery data" is defined as any type of data types 10a-d, composite object data 50 constructed from stitch primitive data 10d or geometric affine transformation data.

Figure 4:
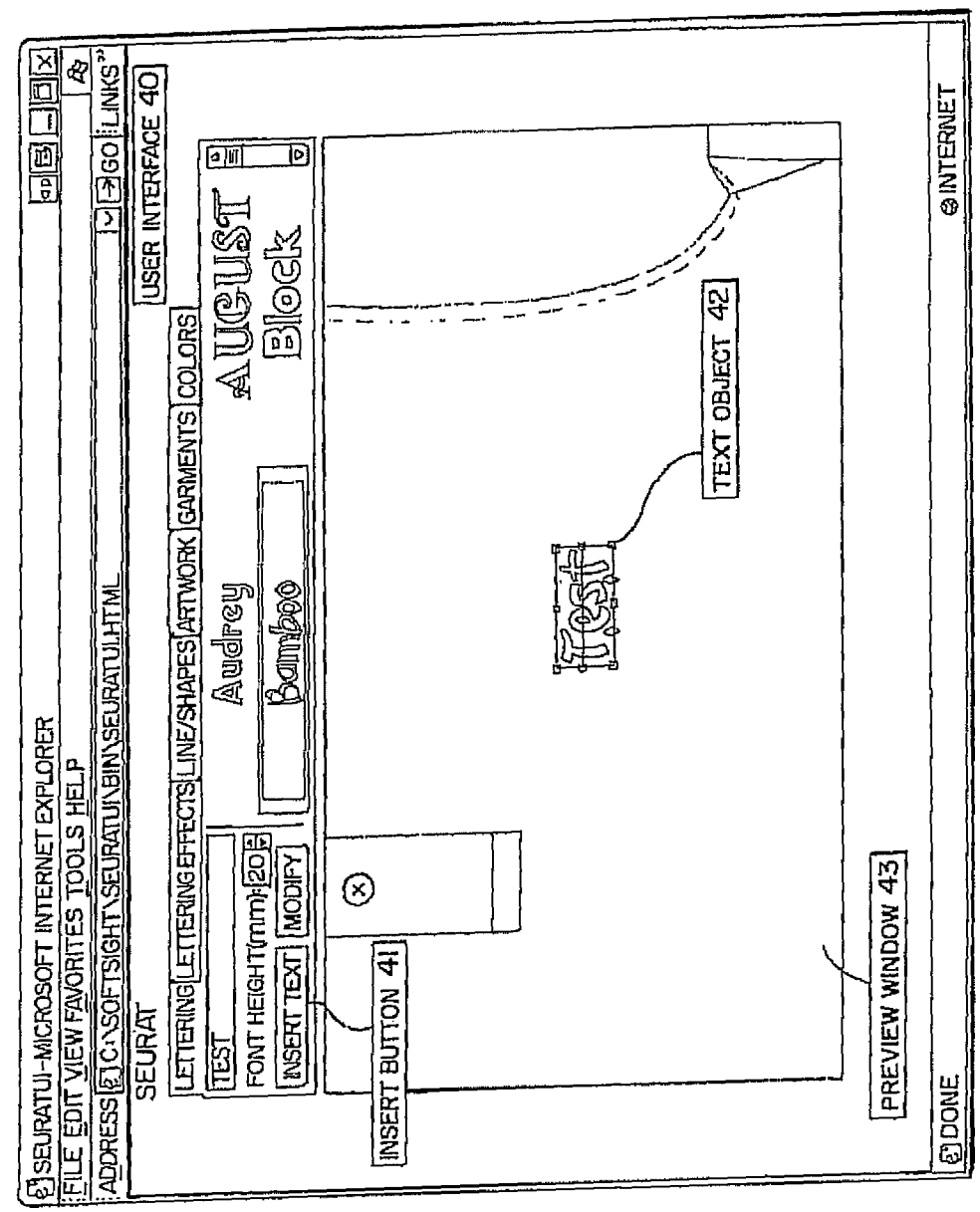
FIG. 4 is an example user interface executing at a client.

Referring to FIG. 3, the client request 30a method allows a client user to request that embroidery data 10a-e be created or modified. An initial client request 30a ultimately may cause the server 21 to send a response that includes actual software to be executed on the client 20. Examples of such software include Adobe Flash® files, JavaScript® or other code that may be executed on the client 20. This software may then be utilized on the client 20 to further facilitate client requests 30*a* as well as the receipt of server responses 30*f* to such requests. Referring to FIG. 4, an example of the appearance of such client 20 software within a client 20 web browser is depicted. FIG. 4 shows an embroidery design, for example the word "Test", within an example user interface 40 window created using an Adobe Flex a Flash/XML based platform, for example, software that executes on the client 20. Using this software, a client user may, for example, specify text as well as a particular font or typeface and size before clicking on an insert button 41 to create an embroidery text object 42 and view it within a provided preview window 43.

Client software allows client requests 30*a* to occur even without explicit interaction from the user. For example, a client request 30*a* can be generated indicating that the server 21 should provide thumbnail images for all fonts or typefaces available to create embroidered lettering. The user interface 40 may then receive those images and display them at appropriate numbered locations, for example within a scrollable list view, where the number of the location may be used to identify the font. Thus, the client software may generate many requests simply to populate various elements of its user interface 40, for example, thumbnail images of garment backgrounds, thread color lists, text effect options, or line or fill area drawing options. One benefit here is that the client user is able to use client software to generate more concise client requests 30*a* as well as to receive more concise server responses 30*f*.

Referring back to FIG. 3, the request encoding 30*b* step is typically performed within client software. In the preferred embodiment, a client user may type text within an edit box, select a font, and select a size. Then, when an insert button 41 is clicked, a request is encoded. In this case, the font choice may be represented as an integer within some range of values, for example 1-4000, the request encoding step 30*b* may then represent that integer as a number using a base higher than base-10, for example, base-64. Thus, using numeric digits as well as upper and lower case letters and symbols a number may be encoded using fewer characters with reference to FIG. 5. This is sometimes useful when generating requests that use HTTP since this protocol is used to send characters and if there are fewer characters in the request, that request may be sent more quickly. This type of encoding may also be employed when representing floating point numbers. More specifically, a 32-bit or 64-bit floating point value, as encoded using the IEEE 754 floating point standard, can be converted to a 30-bit floating point value, for example, modeled after the 754 standard using two fewer bits for the exponent. That 30-bit value may then be converted into a 30-bit integer and translated to a five character base-64 number. Considering this example request, a user may specify the word "Hello" of five characters, assuming 64 character choices per character. The user may then select a font from an example choice of 4000 fonts, and a text size assuming a 30-bit floating point value, the request could be encoded by simply appending twelve characters to an HTTP uniform resource locator (URL). This is assuming five characters for text, two characters for font choice, and five characters for font size. Additionally, it is also possible for client software to apply one of many various compression algorithms to further reduce the number of characters, or data, required to be sent within the encoded request. Sending an encoded request that contains very high level types of embroidery data (refer to the types of data 10*a-e* defined above) often significantly reduces the size of the request making more complex requests feasible from a practical viewpoint and allowing them to be transferred relatively quickly.

The server receipt step 30*c* executes on the server 21 and receives the encoded request data from the client 20. This data must first be decoded, reverse mirroring the operations that occurred during request encoding on the client 20. For example, a number of things may be contained within a request to be decoded including items such as the number of text objects 42 to create, text object data 10*a*, embroidery line data 10*c*, thread information, garment information, and various other parameters that may control the generation and appearance of an embroidery design.

The document creation step 30*d* executes on the server 21 and uses the decoded high level types of embroidery data (refer to the types of data 10*a-e* defined above) to create a document on the server 21 similar to that which is compatible with typical embroidery CAD or design creation software. When a document is created additional lower level types of embroidery data (refer to the types of data 10*a-e* defined above) may be created including low level stitch data 10*e*. With reference to FIG. 6, other types of data created include composite representations 50 of stitch primitive data 10*d*. Composite representations 50 may be created using the same metafile compositing techniques disclosed in a previous application. For example, these representations allow edge contours to be generated for consecutive sets of column primitives 51*a*, only separated by straight primitives 51*b* or stitching, that overlap forming a single contiguous region. This document may then be used by subsequent processing methods to facilitate their operation.

Figure 7A:
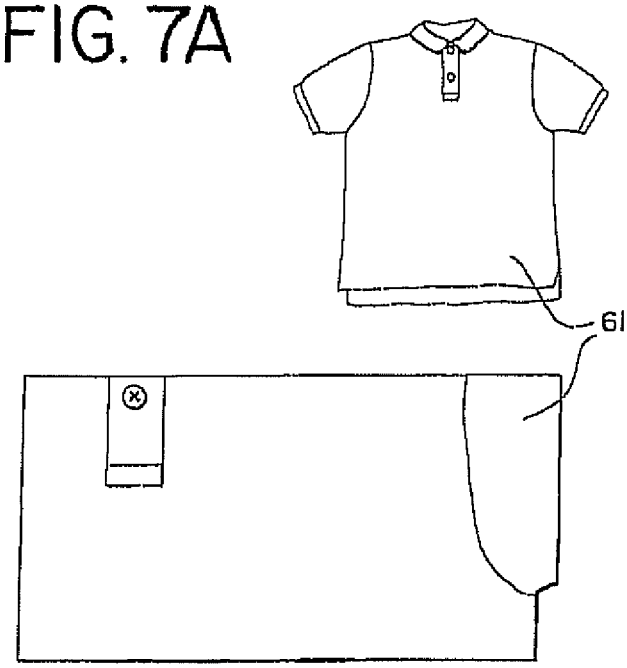
FIGS. 7a-c are depictions of various images that are created and rendered and how they may be combined to show a preview.
Figure 7B:
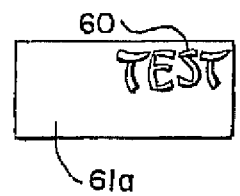
Figure 7C:
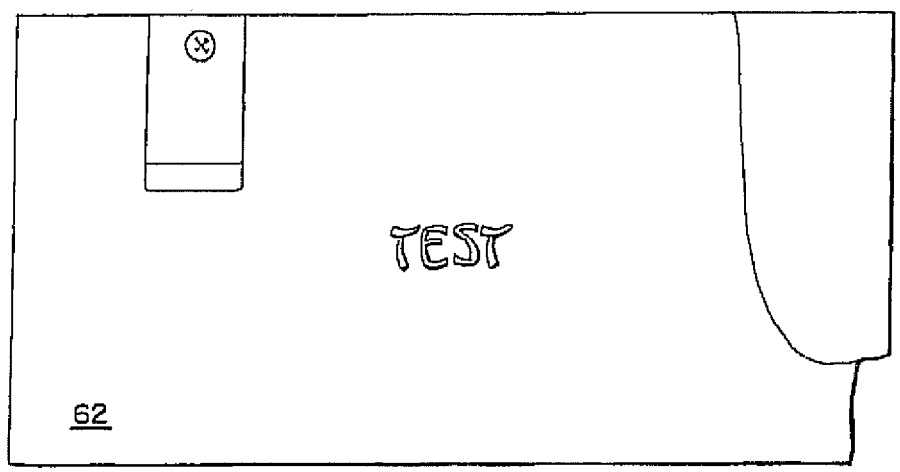

With reference to FIG. 7*a-c*, the step of response creation 30*e* uses the document to create rendered images 60 of the low level stitch data 10*e*, for example on a garment background if specified, as well as high level embroidery data corresponding to those rendered images 60, for example, wireframes, text objects 42, composite representations 50, or line data 10*c*. In this preferred embodiment, two separate image files are created, one file rendering just the substrate 61, for example a picture of the garment that will be embroidered as shown in FIG. 7*a*, and other image file containing a realistic rendering of embroidery stitch data 10*e* associated with the document and depicted on a smaller subsection 61*a* of the overall substrate 61 as shown in FIG. 7*b*. Both the images are placed on a preview window 43 area of a user interface 40 specified by the client 20 such that when the stitch rendered image 60 is placed on top of the substrate 61, a preview image 62 as shown in FIG. 7*c* is formed similar to one that would result if a picture was taken of the embroiderable product after it was actually embroidered at a physical manufacturing facility. The two images created may be produced at different resolutions, for example dots per inch (DPI), but it may then be useful to modify their size through a process commonly referred to as resampling, such that they are ultimately provided at the same resolution. Rendering may also occur in three-dimensional space if the substrate 61, or embroiderable product, is not flat in its appearance. This can be achieved through a process commonly referred to as texture-mapping, where the stitch data rendered image 60 is considered as a texture. When creating the stitch data rendered image 60 it is also useful to note mappings between locations in that image and locations within the substrate 61. More specifically, for each coordinate position in stitch data rendered image 60, it can be determined where, for example at what coordinate position, within the substrate 61 image that position lies. This is useful so that the colors of rendered thread used to simulate the appearance of stitches can be partially combined with colors of the product image to provide a smoother and more realistic rendering, effectively achieving a result commonly referred to as anti-aliasing or super-sampling. The response creation 30*e* step also places information within the response to instruct the client 20 where and how these images are stored.

As mentioned previously, in addition to the creation of images, actual embroidery data 10*a-e* is produced in the response creation step 30*e* as well. This data is created to facilitate display and editing capability at the client 20 and is formulated to correspond directly with the images provided, for example, in scale and offset. This data may indicate the presence of a text object 42 containing multiple composite representations 50 at a particular location where the one or more edge contours of each composite representation 50 are approximated by polygons. The coordinate position of each vertex on each polygon may also be generated and supplied. Coordinate positions for end points or arc points within embroidery line data 10*c* are another example of embroidery data 10*a-e* supplied. In general, much of the embroidery data 10*a-e* supplied here may broadly be referred to as vector data since it largely comprises vertices as well as indicating lines that connect those vertices. This is in contrast to image data which may only include pixel data.

The server response step 30*f* takes the response created previously and formats and transmits it to the client 20. In the preferred embodiment presented here, this data is transmitted in the form of XML and image files over HTTP. XML data may also be encoded or compressed using a process similar to that used when generating a client request 30*a*. The XML file contains the absolute URL of the image files created and embroidery data 10*a-e* related to those image files. FIG. 8 shows an example excerpt of non-encoded XML data.

The client receipt step 30*g* receives the previously transmitted response at the client 20 and decodes and or decompresses it if necessary. This process also translates and stores the data received within native data structures stored locally at the client 20, for example, within a client 20 random access memory (RAM). Storing high level embroidery data locally allows the client 20 software to display and modify that data locally within its user interface 40 without needing to send additional requests to the server 21 which could have a substantial effect on the responsiveness or latency of the user interface 40.

The client editing step 30*h* typically operates as part of client 20 software that executes at the client 20 and allows various means to view, manipulate or edit the embroidery design presented to the user. This includes displaying the provided rendered images 60 and 61 at appropriate locations, for example centered and on top of each other within a preview window 43, and overlaying high level embroidery data, or vector data, on top of one or more of the images when needed. One instance where such vector data is useful is to keep track of the polygonal areas of composite representations 50 such that the method may detect when a mouse cursor clicks or moves within the bounds of such an area. Hence, this allows the client 20 user to click on the image to effectively "select" a text object 42, a letter within a text object 42, a composite representation 50, for example within a single letter, or any other high level embroidery data that is represented using vector data.

Figure 9:
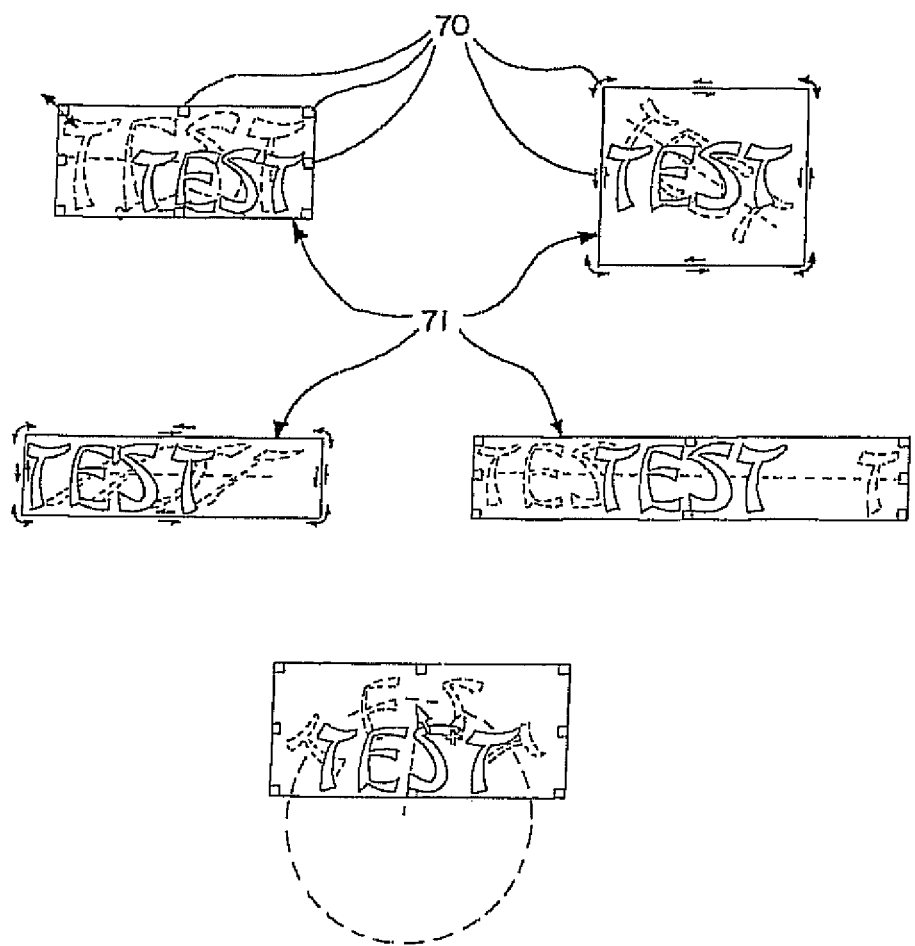
FIG. 9 is depiction of different examples of editing that may be performed at the client.

In addition to selecting items within a user interface 40, the client 20 user may edit such items by using other facilities within the client editing step 30*h* as in FIG. 9. For example, by holding a mouse button down when the mouse cursor is over an item, and then dragging the mouse, the item may be moved or translated to a new position on the substrate 61. The client editing step 30*h* may also present various control points or regions within the user interface 40 that allow many other types of editing. Small square areas, for example user interface (UI) regions 70, may be displayed around the bounding rectangle 71 of an item such that when these points are clicked and dragged by a client 20 user, the related item may be scaled or rotated. Other UI regions 70 that allow character kerning within text objects 42 or applying various effects such as arcing may also be supported. A significant benefit to this method is that while the mouse is being clicked or dragged in these various ways, the actual effects of the edits may be visible in real-time by applying such edits directly to the vector data stored locally in RAM and then displaying the vector data within the preview window 43, for example, overlapped on top of the rendered substrate 61 image. The visual feedback that this provides to the client 20 allows easier and more precise edits since the precise size, position, and orientation of items may be viewed while performing the edit.

The client editing step 30*h* is also responsible for initiating new client requests 30*a* to send updated high level embroidery data to the server 21 which ultimately results in new rendered stitch data images 60 and updated high level embroidery data being sent back to the client 20. These new client requests 30*a* often contain information describing transformation matrices and other data that allows the edits that occurred on the client 20 to be applied within documents being created on the server 21. Because many requests may be generating while a client 20 makes edits, these requests may be numbered sequentially where the number is sent along with the request to the server 21. This will allow responses to be labeled with those numbers as well making it possible for the client receipt 30*g* process to ignore responses that may no longer be relevant, for example, due to the initiation of newer requests.

It is also useful to note that the method and processes disclosed within this application may be further extended by their combination with methods disclosed within previous patents and patent application publications of the inventor(s). More specifically, a client request 30*a* may contain image or metafile data, for example in addition to or instead of other high level embroidery data, for the server 21 to automatically convert into embroidery data 10*a-e* using previously disclosed steps. This image or metafile data may be supplied by the client 20, for example via image files that were resultant from scanning pictures using a computer scanner or for printing documents using a printer driver (e.g. see application entitled Printer Driver Systems and Methods for Automatic Generation of Embroidery Designs).

From the foregoing, it can be seen that the teachings of the disclosure set forth a method and system for creating and manipulating embroidery designs over a wide area network. The method includes steps to transmit various embroidery design data over a wide area network between a client and a server. The manner in which the embroidery design data is created, manipulated, and transmitted allows a user to preview photo-realistic renderings of possible finished products, and more precisely adjust interpretations through a provided user interface with minimum latency.

What is claimed is:

1. An apparatus for manipulating an embroidery design via a communication network, comprising:
   a user interface;
   a processor; and
   a memory comprising instructions which, when executed, cause the processor to at least:
      access a communication received from a server, the communication including embroidery data;

store the embroidery data in the memory;

display, via the user interface, a first image based on the embroidery data;

edit the embroidery data stored in the memory to create modified embroidery data in response to receiving a command via the user interface; and display, via the user interface, a second image based on the modified embroidery data in the memory.

2. An apparatus as defined in claim 1, wherein the embroidery data and the modified embroidery data comprise vector data.

3. An apparatus as defined in claim 1, wherein the memory is a random access memory.

4. An apparatus as defined in claim 1, wherein the command comprises at least one of a cursor click or a cursor drag.

5. An apparatus as defined in claim 1, wherein the instructions are further to cause the processor to edit the embroidery data to modify at least one of a physical size of an embroidery pattern, a location of the embroidery pattern, or an orientation of the embroidery pattern, based on the command.

6. An apparatus as defined in claim 1, wherein the communication from the server further comprises a rendered image of a substrate, and the instructions are further to cause the processor to display the second image based on the rendered image of the substrate.

7. An apparatus as defined in claim 6, wherein the instructions are further to cause the processor to display the second image overlapped with the rendered image of the substrate.

8. An apparatus as defined in claim 1, wherein the instructions are further to cause the processor to transmit a first request representative of the edit to the embroidery data.

9. An apparatus as defined in claim 8, wherein the instructions are further to cause the processor to:

edit the modified embroidery data to create second modified embroidery data; and transmit a second request representative of the edit to the modified embroidery data, the second request to cause the server to cancel the first request.

10. An apparatus as defined in claim 8, wherein the instructions are further to cause the processor to receive a second communication from the server, the second communication comprising second embroidery data based on the edit to the embroidery data.

11. An apparatus as defined in claim 1, wherein the communication comprises at least one of wireframe data, text object data, a composite representation, or line data.

12. An apparatus as defined in claim 1, wherein the instructions are further to cause the processor to:

access a second communication from the server, the second communication comprising second instructions, the processor to edit the embroidery data stored in the memory to create the modified embroidery data by executing the second instructions in response to the receiving the command via the user interface.

13. An apparatus as defined in claim 12, wherein the second instructions comprise software to view, manipulate, and edit the embroidery data stored in the memory.

14. An apparatus as defined in claim 1, wherein the communication from the server further comprises a uniform resource locator of an image file that was created by the server and that corresponds to the embroidery data.

* * * * *